May 5, 1931.  J. H. GREENLEY  1,804,257

AUTOMATIC CONTROL SYSTEM FOR VEHICLES

Original Filed Jan. 28, 1925  5 Sheets-Sheet 1

Inventor
J. H. Greenley
By
Attys.

May 5, 1931. J. H. GREENLEY 1,804,257
AUTOMATIC CONTROL SYSTEM FOR VEHICLES
Original Filed Jan. 28, 1925 5 Sheets-Sheet 2

Inventor
J. H. Greenley
By Aull, ..... 
Attys.

May 5, 1931.   J. H. GREENLEY   1,804,257
AUTOMATIC CONTROL SYSTEM FOR VEHICLES
Original Filed Jan. 28, 1925   5 Sheets-Sheet 3

Inventor
J. H. Greenley
By Hull, Brock & Wes
Attys.

May 5, 1931.  J. H. GREENLEY  1,804,257
AUTOMATIC CONTROL SYSTEM FOR VEHICLES
Original Filed Jan. 28, 1925  5 Sheets-Sheet 4

Inventor
J. H. Greenley
By Hull, Burk & West
Attys.

Patented May 5, 1931

1,804,257

UNITED STATES PATENT OFFICE

JAY H. GREENLEY, OF STRONGSVILLE, OHIO

AUTOMATIC CONTROL SYSTEM FOR VEHICLES

Application filed January 28, 1925, Serial No. 5,291. Renewed August 20, 1929.

The fundamental purpose of my invention is to provide a system by means of which one operator may drive and fully control, in all emergency cases, a plurality or train of motor vehicles, each vehicle being propelled by its own motor and those following the leading vehicle being automatically operated from the control mechanism of the leading vehicle as it is manipulated by the driver in the usual way.

The value of such a system is self evident as it enables a number of motor vehicles to be driven to distributing points remote from the manufacturing plant by a single operator and at considerable of a saving over the employment of a driver for each car. The system has obvious advantages over the plan of towing vehicles as it relieves the engine of the leading vehicle of abnormal load and avoids undue strains being imposed upon the following vehicles. Furthermore it affords a more reliable control of all vehicles, and obviates the skidding and "whip-action" incident to the towing of vehicles.

Other objects of the invention are to provide a system of the aforesaid character that is safe, in the hands of the average driver; that is comparatively simple and inexpensive; that is comprised of a minimum number of units; and wherein the units are especially convenient of application to the motor vehicles, requiring no changes of any sort in the vehicles and being adapted to be attached thereto by suitable clamping means so as not to mar or mutilate any parts of the vehicles.

While my invention comprehends the adaptation of the system to all types of motor vehicles, my present disclosure shows it as designed for use in connection with Ford automobiles.

Broadly speaking, the invention consists of several units which are designed for attachment, respectively, to a leading motor vehicle and each of a plurality of following motor vehicles, with suitable steering connections between the adjacent ones of the vehicles which make up the train, and connections between the several units so that, through manipulation of the unit of the leading vehicle, those of the following vehicles will be caused to operate in unison therewith.

To simplify the present exhibition of the invention I have resorted to conventional representations of many of the parts, as obviously, numerous changes may be made in such parts without in any way departing from the spirit of the invention. The system may be part electric and part pneumatic, or it may be all-electric, both types of systems being illustrated in the accompanying drawings.

With the foregoing objects in view, as well as those hereinafter appearing as the detailed description proceeds, the invention may be defined generally as consisting of the combination and arrangement of parts set forth in the claims annexed hereto and illustrated in the accompanying drawings wherein

According to the embodiment of the invention to be described first, the control of each of the following vehicles from the leading vehicle is accomplished through electrical and pneumatic means. A mechanical connection is made between each vehicle and the one preceding it through the steering mechanism illustrated in Fig. 9. This mechanism consists of a yoke 1 that is suitably clamped to the rear axle 2 of the leading vehicle and to the end portions of which yoke are pivotally connected links 3 and 4. The latter is pivoted at its rear end to the end portion of a yoke 5 that is suitably clamped to the front axle 6 of a following vehicle. Pivotally attached to the end portion of the yoke 5 remote from that to which the link 4 is connected is an angle lever 7 which has its rear end suitably attached at 8 to the usual tie rod 9 which connects the steering knuckles of the front wheels of the following vehicle. Forwardly of its pivot, the lever 7 has connected to it the rear end of the link 3, and the lever 7 is yieldingly maintained in a given position by compression springs 10 that are mounted upon a rod 11, which has its rear end attached to the adjacent end of the yoke 5. The remote ends of the spring 10 bear upon abutments 12 of the rod 11, while their adjacent ends engage a block 13 which is slidable on the rod 11 and has pivotal connection with the forward end of the lever 7. By reason of this construction and arrangement of parts, the following vehicle is steered and kept substantially in the tracks of the preceding vehicle as will be readily understood from a brief consideration of the operation of the mechanism. Let it be supposed that the preceding vehicle turns to the left. This will cause such relative movement between the links 3 and 4 as will result in the steering wheels of the following vehicle first turning slightly to the right and then assuming substantial alignment with the respective wheels of the preceding vehicle as the latter resumes its straight course of travel. The foregoing mechanism is purely for steering purposes as the vehicles are propelled individually by their respective motors.

Figure 1:
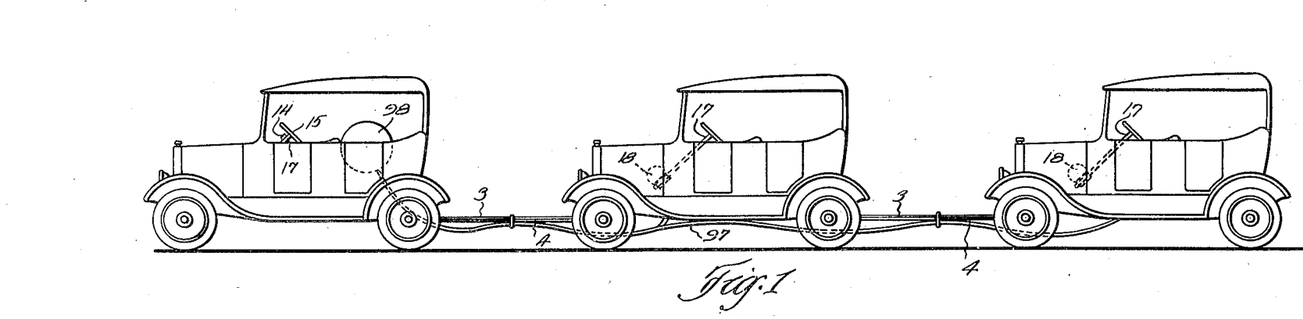
Fig. 1 shows, in side elevation, a train of motor vehicles equipped with the invention.
Figure 7:
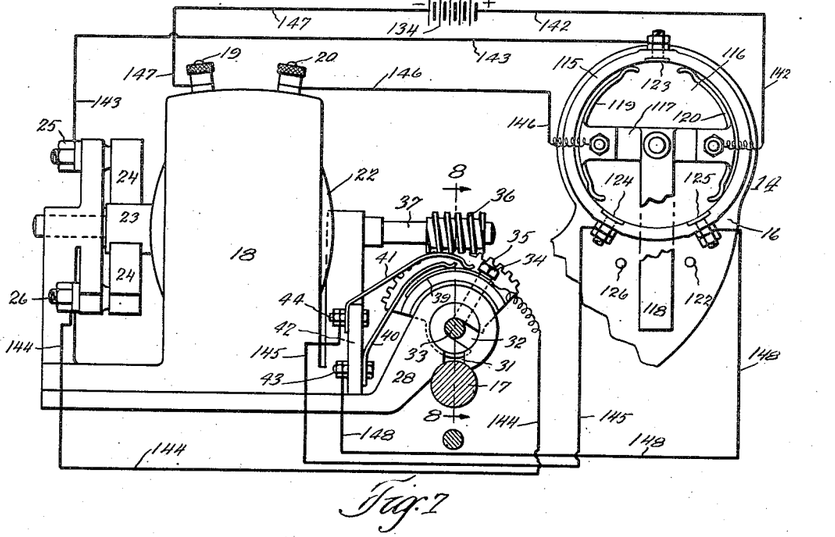
Fig. 7 shows, more or less diagrammatically, the switch that is located on the leading vehicle and the motor driven mechanisms of one of the following vehicles by means of which the gas throttle of said vehicle is operated.

In preparing the train for transportation, the vehicles are lined up, and the steering mechanisms are coupled to the front and rear axles of adjacent machines. An electric switch 14, shown in detail in Fig. 7, is attached, as by a suitable clamp (shown in Fig. 10) to the steering column 15 (Fig. 1) of the leading vehicle. This clamp comprises a curved supporting arm 16 which is provided with a boss 16$^a$ that is adapted to fit within the elliptical opening in the right hand sector of the gas throttle. A screw 16$^b$, threaded through said boss, is fitted at its extremity with a shoe 16$^c$ that is adapted to fit within the opposite end of the elliptical opening and by rotating said screw to spread the boss 16$^a$ and shoe 16$^c$ it will be obvious that the arm 16 will be securely held in position. The switch mechanism 14 is mounted on the outer end of arm 16 and is operatively connected to the gas throttle lever in a manner to be referred to hereinafter. Disposed beneath the hood of each of the following vehicles, is a throttle control mechanism designated generally by the numeral 18. This mechanism is also shown in detail in Fig. 7. The throttle control mechanism incorporates an electric motor having the usual field winding, the terminals of which are represented by the binding posts 19 and 20. The windings of the armature 22 are adapted to have electrical connection through the commutator 23 and brushes 24 with the binding posts 25 and 26. The motor base includes a bracket 28 which extends forwardly and upwardly from the motor, the bracket having spaced bearing portions 29 (Fig. 8) within which are journaled the reduced ends of an oscillating head 30. The bearing portions of the bracket have notches 31 and the head is provided with a channel 32 (Fig. 7) arranged to receive, when in register with the notches 31, the throttle operating rod 33 of the vehicle whereon the mechanism is mounted. The channel is deep enough to permit the rod to assume axial alignment with the head, and the head is adapted to be locked to the rod by means of set screws 34. The mechanism is designed to rest at one end on the steering column and engage at its opposite end suitable adjacent portions of the vehicle structure thereby to be properly supported without further attachment.

A worm gear segment 35 is fixed to the head 30 and meshes with a worm 36 on the armature shaft 37 of the motor. Applied to the curved surface of the head 30 is a plate 38 of insulating material on which is mounted a contact rail 39, and arranged for engagement with said rail are the spring contact fingers 40 and 41 which are carried by an insulating base 42 incorporated in the motor structure, the contact fingers being equipped with the respective binding posts 43 and 44.

Figure 3:
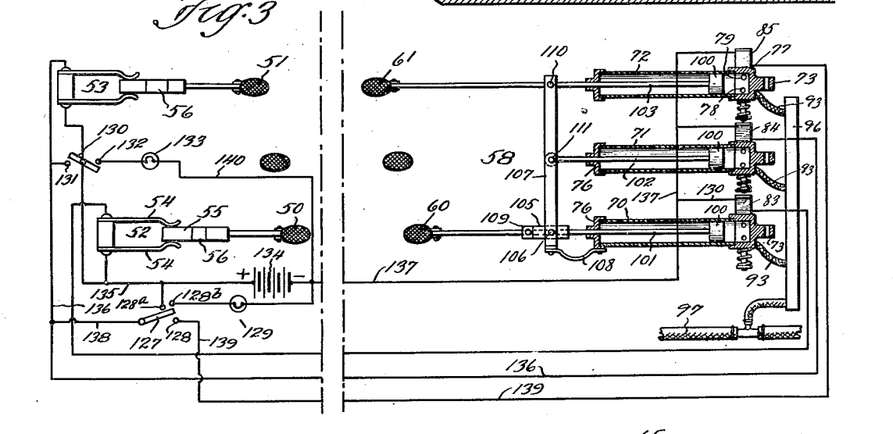
Fig. 3 shows, in greater detail, and on a somewhat enlarged scale, certain parts of Fig. 2.

Associated with the control pedals of the leading and following vehicles are, respectively, the switches and the pneumatic cylinders shown in detail in Fig. 3. The change-speed pedal of the leading vehicle is designated 50 while the brake pedal is designated 51. Associated with the former is a switch 52 and with the latter, a switch 53. According to the conventional illustration of these switches, each is comprised of opposed spring contact fingers 54 between which a block 55 of insulating material is adapted to slide, said block having an insert 56 of suitable conductive material and being so connected to the pedal that when the pedal is depressed the block will be pushed forwardly and bring the insert 56 between the fingers 54 and thus electrically connect the fingers.

Figure 2:
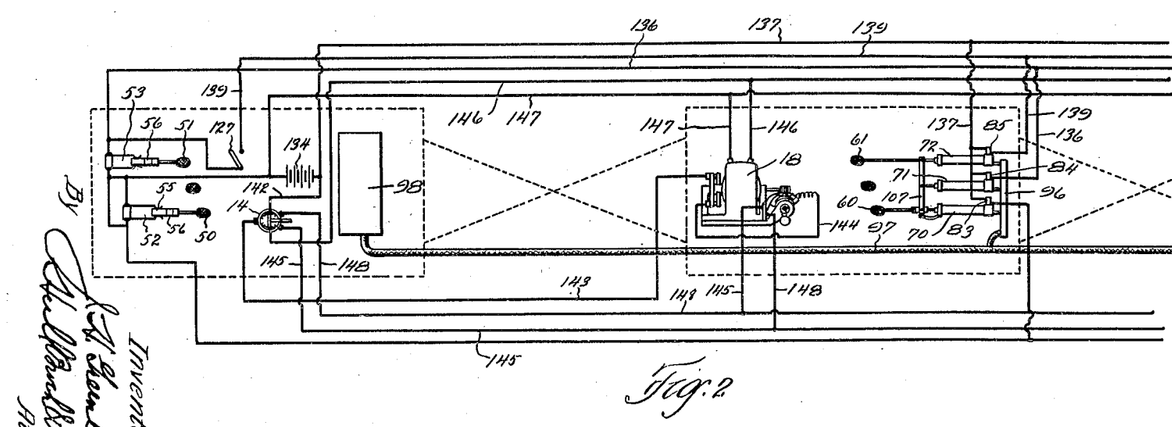
Fig. 2 is a diagram including the leading and one of the following vehicles.
Figure 4:
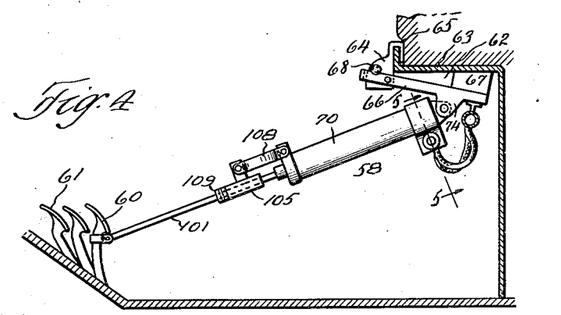
Fig. 4 shows, in side elevation, the means for operating the speed control pedal and brake pedal of a following vehicle.
Figure 5:
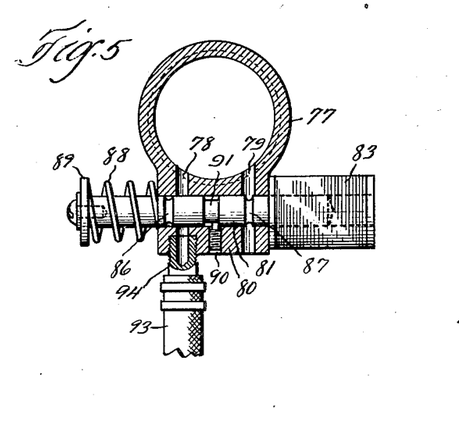
Fig. 5 is a sectional detail on the line 5—5 of Fig. 4.
Figure 6:
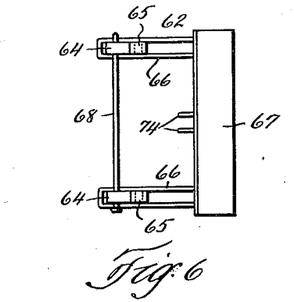
Fig. 6 is a plan view of the clamp bracket for attaching the mechanism of Fig. 4 to the seat of one of the following vehicles.

58 refers generally to pneumatic mechanism that is associated with the change-speed pedal 60 and brake pedal 61 of each of the following vehicles. Referring to Figs. 4 and 6, 62 is a clamp bracket that is adapted to be attached to the seat 63 of the vehicle. The bracket includes members 64 having hooks 65 which are adapted to be engaged over the front flange of the seat 63, and these members have pivoted to them U-shaped arms 66 which extend rearwardly beneath a block 67 to which they are secured. When the members 64 are engaged over the flange of the seat and the block 67 is forced upwardly beneath the overhanging front portion of the seat, a pin 68 is adapted to be inserted through aligning holes in the members 64 thereby to bind the parts to the seat. The cylinders 70, 71 and 72 have their rear ends pivotally connected, through lugs 73, to ears 74, those ears associated with the cylinders 70 and 72 being preferably formed with the arms 66 while those associated with the cylinder 71 extend downwardly and forwardly from the block 67, as shown in Fig. 6. Each of the cylinders is formed of a tube which has a head 76 applied to its forward end and a fitting 77 applied to its rear end. The fitting 77 may be cast, and the previously mentioned lug 73 may be formed integral with it. Each fitting 77 is recessed to constitute a continuation of its respective cylinder, and is provided with an inlet port 78 and an exhaust port 79 (see Figs. 3 and 5). Slidable within a transverse bore of an extension 80 of the fitting 77 is a plunger 81 which, as shown in Fig. 5, is constituted of the extended end of the core of a solenoid, the solenoids associated with the respective cylinders 70, 71 and 72 being designated 83, 84 and 85 in Figs. 2 and 3. The plunger 81 is shown as provided with annular grooves 86 and 87, and the plunger is projected to normal position—that shown in Fig. 5—by a spring 88 which surrounds the protruding end of the plunger and is compressed between an abutment 89 thereon and an opposed part of the fitting 77. The plunger is limited in its outward movement by a stop constituted of the inner end of a screw 90 which is threaded through the extension 80 and occupies a groove 91 of the plunger. When the solenoid is energized the plunger 81 is retracted to bring the groove 86 into register with the port 78 and the groove 87 out of register with the port 79. Consequently, the port 79 is closed while the port 78 is open to admit pressure fluid from a hose section 93 which has connection with a nipple 94 that is threaded into a counterbore of the port 78. The hose section 93 of the three cylinders are connected with a manifold 96 (Figs. 2 and 3) which, with the manifold of the other following vehicles, is connected through a conduit 97, with an air reservoir 98 that is carried by the leading vehicle. This reservoir may be kept supplied with compressed air by means of a suitable pump that may be operated as desired; and there may be an unloader for the reservoir or a throw-off for the pump, which serves to automatically keep the pressure below an excessive or dangerous value. These matters pertain to common and well known expedients and are deemed unnecessary of specific illustration as any one skilled in the art will readily supply them.

Pistons, designated 100, operate within the cylinders 70, 71 and 72, and connected to the pistons of the respective cylinders are rods 101, 102 and 103. The rod 101 is slidable through a sleeve 105 that is pivotally connected at 106 to a cross bar 107. One end of this bar is shown as having connection, through a strap 108, with the adjacent end of the cylinder 70. By this arrangement the bar is permitted a limited movement in a direction away from the cylinder. Secured to the rod 101, beyond the sleeve 105, is a collar 109 wherewith the sleeve is adapted to engage. The rod 101 extends beyond the collar and is suitably connected to the speed-change pedal 60. The rod 103 of cylinder 72 is similarly connected to the brake pedal 61 and it has pivoted to it, at 110, the opposite end of the cross bar 70. The forward end of the rod 102 of cylinder 71 is pivotally connected at 111 to the middle of the cross bar.

Figure 10:
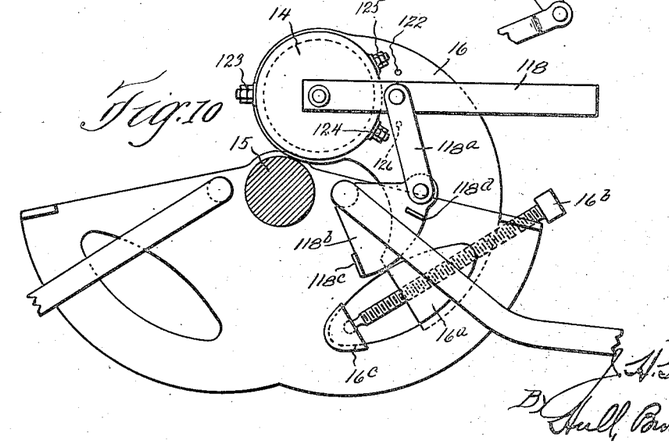
Fig. 10 is a horizontal sectional view through the steering column and showing in elevation the gas control lever quadrant and the supporting structure for the throttle control switch attached thereto.

Returning now to the switch, shown in Fig. 10 and in detail in Fig. 7, the same is comprised of an annulus 115 of suitable insulating material that is fixed to a base 116, and this base is mounted on the steering column 16 of the leading vehicle, as previously described.

Mounted for oscillation upon the axis of the annulus 115 is a switch member 117 which incorporates an operating handle 118. The switch member carries opposed contact shoes 119 and 120. When the handle 118 is in neutral position, as shown, the switch is open. When the handle is moved in a counter clockwise direction until it is engaged with a stop 122 on the arm 16, it engages the forward end of shoe 120, with a contact 123, and the rear end of shoe 119 with a contact 124, said contacts, with a further contact 125, being embedded within the inner face of the annulus 115 so that their exposed surfaces are flush with the interior surface of the annulus. The contacts 123, 124 and 125 are provided with individual binding posts that are on the exterior of the annulus. When the handle 118 is swung in the opposite direction into engagement with the stop 126, the rear end of the shoe 120 is engaged with contact 125, while the forward end of the shoe 119 is engaged with the contact 123. This switch, as will presently appear, is used for controlling and reversing the motors of the throttle control mechanisms 18 of the following vehicles. The operating lever handle 118 is connected by means of a lever 118ᵃ to a segment 118ᵇ which is pivotally supported for rotation about the gas throttle lever as shown in Fig. 10. This segment is provided with a pair of upstanding spaced abutments 118ᶜ and 118ᵈ, arranged on each side of the throttle lever. This arrangement permits a limited movement of the gas throttle lever and switch handle independent of each other, but by swinging the gas throttle lever to a substantially full open or full closed position, the switch handle 118 will be moved in accordance therewith due to the throttle lever engaging the abutments 118ᶜ and 118ᵈ thereby moving segment 118ᵇ, link 118ᵃ and handle 118 therewith.

Placed in a convenient position, preferably on the steering column 15, is a switch 127 which is shown in Fig. 3. This switch is normally closed with contact 128, but opened when driving down a long hill, when the use of both cylinders 71 and 72 would press the brakes too firmly and tend to cause the wheels to skid on the road. Opening this switch will render solenoid 85 inoperative and hence cylinder 72 will fail to operate. In this event cylinder 71 will function when brake pedal 51 is depressed and thereby force cross bar 107 forward at its central point which will carry sleeve 105 up against collar 109 on the change speed pedal rod and force said rod and pedal forward until limited in its movement by strap 108, thereby placing said pedal in neutral position. Meanwhile cross bar 107 has carried brake pedal 61 forward to apply the brake lightly. It is thus apparent that when switch 127 is out of circuit with contact 128, and brake pedal 51 is depressed, each of the other cars will have their change speed pedals 60 moved to a neutral position and the brake pedals 61 depressed to apply the brakes lightly. I preferably arrange switch 127 so that when it is moved off of contact 128, it will automatically close with a pair of aligned contacts 128ᵃ and 128ᵇ and close the circuit therebetween which will light a signal lamp 129 as will be explained hereinafter, to warn the driver and remind him that pressure on the brake pedal will only apply the brakes lightly due to the fact that cylinder 72 is inoperative.

Located on the steering column, not far from switch 127, but sufficiently out of the way so that only careful forethought would lead to its operation, is a second switch 130 which is in parallel circuit with the brake pedal switch 53. This switch may be cosed with a contact 131 by hand when the operator desires to set the brakes as when he leaves the vehicle or is starting the motors of the vehicle train and thereby obviates the necessity of someone holding the brake pedal 51 depressed under such conditions. This switch is also adapted to engage a second contact 132 when it is closed and thereby complete the circuit through a signal lamp 133 as will be explained hereinafter, and warn the driver that the brakes are set.

In describing the operation of the system, reference will be made to the units carried by the leading and one of the following vehicles, although it will be understood that the units of the remaining vehicles are identical with that of the following vehicle described and all operate in unison.

Figures 8, 9:
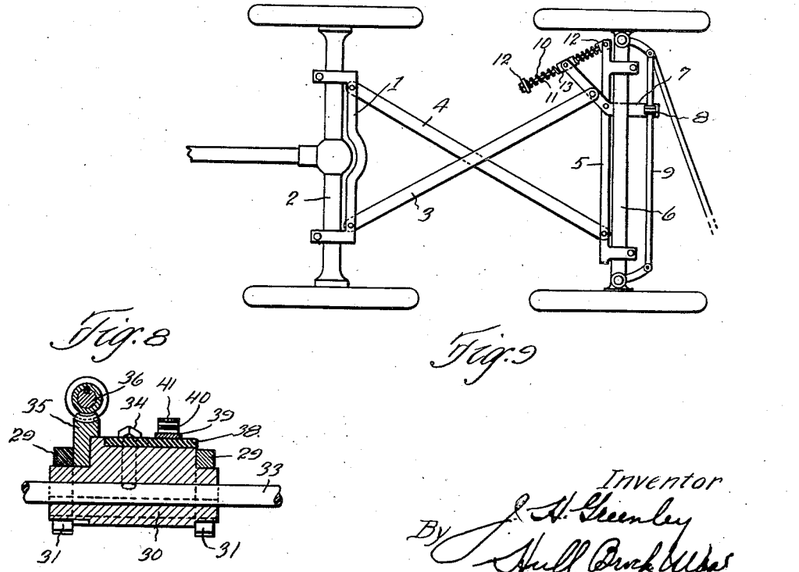
Fig. 8 is a sectional detail on the line 8—8 of Fig. 7.
Fig. 9 is a plan view of the contrivance by means of which a following vehicle is automatically steered from the one to which it is coupled.

Assuming that the vehicles are connected together through the steering mechanism illustrated in Fig. 9, that the various units are installed on the several vehicles as described, that electrical connections are made with the battery of the leading car as will hereinafter appear, and that the tank 98 is stored with a supply of pressure fluid, the operation will be as follows:

Referring to Fig. 3, switch 130 will be closed to apply the brakes of the vehicles. Current will flow from battery 134, wire 135, switch 130 to contacts 131 and 132. From contact 131, current will flow through wire 136, solenoid 84, and wire 137 back to the battery. Meanwhile current will also flow from wire 136 through wire 138, switch 127, contact 128, wire 139, solenoid 85, and wire 137 to the battery. Solenoids 84 and 85 are thus energized to operate cylinders 71 and 72 which place pedal 60 in neutral position as previously explained and apply brake pedal 61 so that the brakes are tightly set. When switch 130 is closed current will also flow through contact 132, signal lamp 133 and wire 140 back to the battery thereby lighting this lamp.

Switch arm 118 (referring to Figs. 7 and 10) is now moved in a counter clockwise direction against stop 122 either independently or by closing the gas throttle lever on the leading car. Current from battery 134 will then flow through wire 142, shoe 120 of the switch, contact 123, wire 143, to binding post 25 then through the armature to binding post 26, wire 144, contact rail 39, finger 41, binding post 44, wire 145, contact 124, shoe 119, wire 146, binding post 20, through the field winding to binding post 19, thence through wire 147 to the battery. This serves to energize the motor of the throttle control mechanism 18 of each trailer vehicle causing the throttle rods 33 to be rotated to a closed position. During the rotation of the motor of each mechanism, which in turn rotates its respective worm 36 and worm gear segments 35, the finger 41 will eventually ride off the contact rail 39 which opens the motor circuit. Hence the throttle control switch lever 118 may be moved to engage stop 122 and left there and each of the throttle control mechanisms will close the throttle of its respective trailer to an idling position, then stop automatically.

Having closed the throttles to idling positions, the operator now proceeds to each trailer and closes the ignition circuit and starts the motor, then releases the emergency brake of each trailer. He now takes his seat in the leading car and starts the motor. From this point on, the operation of the train of vehicles is automatic with the operation of the leading vehicle which is operated in the usual manner. The emergency brake of the leading vehicle is released while the change speed pedal is held in neutral by his foot and the brake pedal is held down while switch 130 is opened. The throttle control lever is moved to open the throttle of the leading vehicle a suitable distance and the switch handle 118 is moved in a clockwise direction to engage shoe 119 which contact 123 and shoe 120 with contact 125. This will permit current to flow from battery 134, wire 142, shoe 120, contact 125, wire 148, binding post 43, finger 40, which because of its position has remained in contact with rail 39, thence through rail 39, wire 144, binding post 26, through the armature, to binding post 25, wire 143, contact 123, shoe 119, wire 146, through the field of the motor thence through wire 147 to the battery 134. The reversal of current through the motor serves to rotate the motor in an opposite direction thereby rotating the throttle rod 33 in a direction to open the throttles of the trailers. When the throttles of the trailers have been opened to the desired point, the switch handle 118 is returned to neutral position.

Having set the throttles of all the vehicles to the desired positions, the brake pedal of the leading car is released which opens switch mechanism 53 and this in turn breaks the solenoid circuit of each of the trailers so that solenoids 84 and 85 are de-energized and the cylinders 71 and 72 are unloaded thereby releasing the brakes on each trailer. The change speed pedal 50 of the leading car is now depressed to start the train in low speed. This closes switch 52 which serves to energize solenoid 83 on each trailer and hence cylinder 70 of each trailer receives pressure fluid to cause the low speed pedal thereon to be depressed.

The vehicle train is thus started in low gear. After sufficient speed has been attained in low gear, the operator releases the change speed pedal 50 to permit the shift into high gear and at the same instant closes the gas throttle lever so as to compensate for the change in gearing between the engine and propeller shaft, such operations being the usual mode of operating the vehicle. Releasing of pedal 50 opens switch 52 and hence opens the circuit of each solenoid 83 and releases the plunger 81 thereby shutting off the air pressure to the cylinder and simultaneously opens the exhaust port 79. The change speed pedal is thus free to move rearwardly into high gear on each trailer and the train as a unit is then in high gear. The speed of the train is controlled through the throttle lever on the leading car and the operation of the switch handle 118 as previously described.

When it is desired to stop for any reason, the operator depresses change speed pedal 50 on the leading car to a neutral position and depresses the brake pedal 51 to apply the brake on the leading car. When brake pedal 51 is depressed, switch 53 is closed which energizes solenoids 84 and 85 thereby causing the brake pedal 61 to be depressed on each trailer and the change speed pedal 60 thereon to be depressed to a neutral position. The closing of switch 53 permits current to flow from battery 134 through wire 135, through switch 53, wire 136, solenoid 84 and wire 137 to the battery. Current also flows from wire 136 through wire 138, switch 127, contact 128 (the normal position of switch 127 being in engagement with contact 128) wire 139, solenoid 85 thence through the common return wire 137 to the battery. Solenoids 84 and 85 operate, as previously described in connection with solenoid 83, to permit pressure fluid to be admitted to cylinders 71 and 72 thereby forcing their respective pistons 100 forwardly. The piston rods 102 and 103 being connected to the cross bar 107, carry said bar forwardly until such movement is arrested at one end by strap 108, thereby placing change speed pedal 60 in neutral position as has been previously explained. The opposite end of the bar continues forwardly and depresses the brake pedal 61 and hence the brakes on each car of the train are simultaneously applied and the train brought to a stop.

When the foregoing stop was being made the operator closed the gas throttle on the leading car, and by referring to Fig. 10 it will be noted that the throttle lever in so closing engaged abutment 118$^d$ and rotated the segment 118$^b$ in a counter clockwise direction. This motion was transmitted to switch handle 118 through link 118$^a$, hence the throttle on each trailer was automatically closed. In this connection it will be noted that if for any reason it is desired to start the train quickly or accelerate quickly while in motion, the operator opens the throttle lever of the leading vehicle to full open position and this automatically engages abutment 118$^c$ thereby rotating switch handle 118 clockwise and hence the throttle of each trailer is automatically opened. Under average running conditions, the switch handle 118, and the throttle lever of the leading car are operated independently as permitted by the lost motion connection between said lever and the abutments 118$^c$ and 118$^d$, but in emergencies, the operation of the throttle lever to either a minimum or maximum position will automatically effect a corresponding position of the throttle of each trailer.

Figure 11:
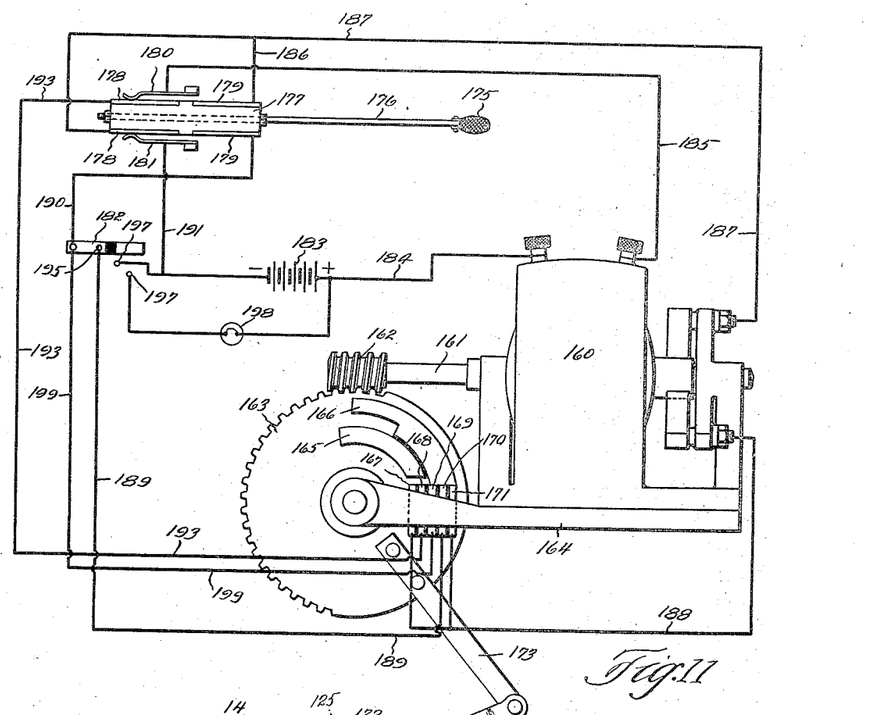
Fig. 11 is an elevation of the electric brake control mechanism.
Figure 12:
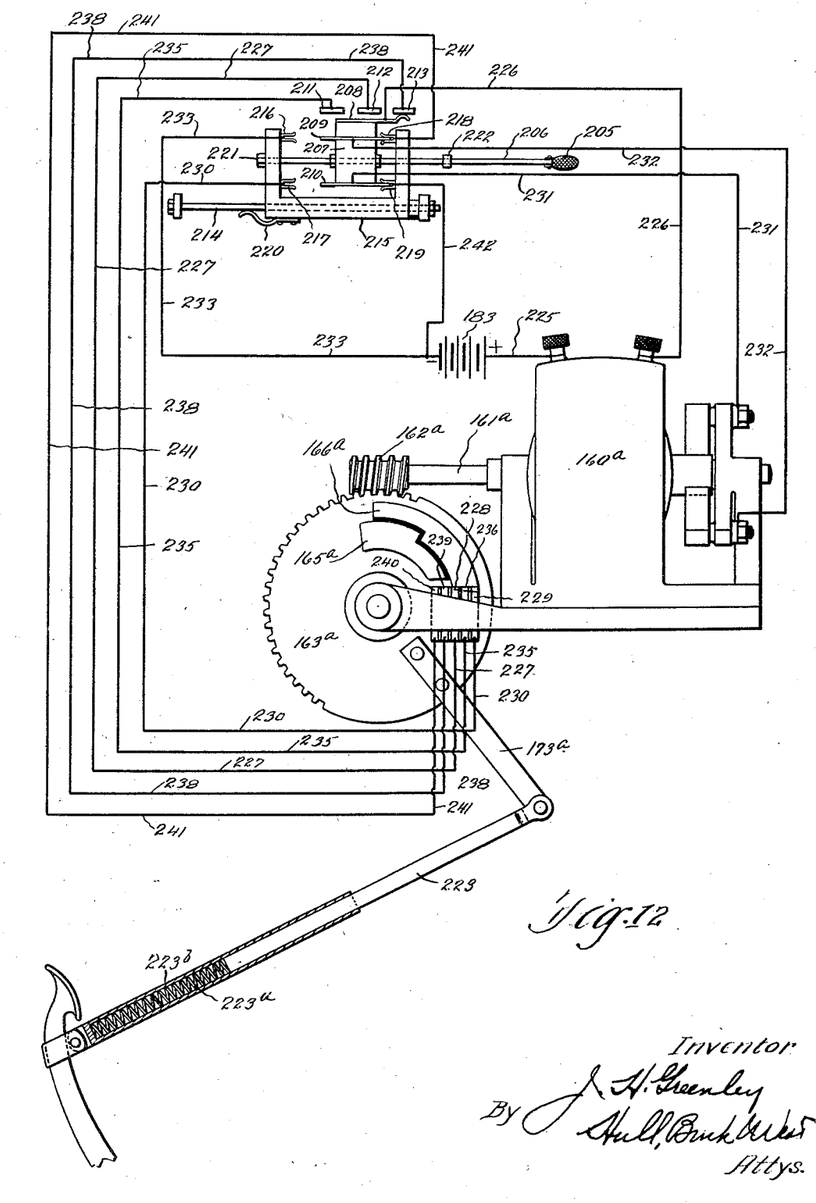
Fig. 12 is a similar view of the electric change speed pedal control mechanism.

In Figs. 11 and 12 I have shown a modified form of control for the brake and change speed pedals wherein the pneumatic cylinders and associated parts are dispensed with and such pedals are controlled entirely by electricity.

Referring particularly to Fig. 11 wherein the brake control mechanism is illustrated, 160 denotes a reversible electric motor similar to that described in connection with the throttle control mechanism. The armature shaft 161 of the motor is fitted with a worm 162 which meshes with a worm gear 163 suitably pivoted on the base 164 of the motor. The worm gear carries a pair of segmental contact rails 165 and 166 which are insulated from each other. Cooperating with these contact rails are a plurality of brushes or contact fingers 167, 168, 169, 170 and 171 which are insulated from each other and are adapted to engage the respective contact rails upon rotation of the worm gear. An arm 173 is rigidly connected at one end to the gear 163 and at the opposite end said arm is connected through a resilient connection to the brake pedal of one of the trailers. This resilient connection is identical with that used in connection with the change speed pedal mechanism and a detailed description thereof will be given hereinafter. Detachably connected to the brake pedal 175 of the leading car is a rod 176 which carries a block of insulating material 177 that is provided on opposite sides with pairs of contact rails 178 and 179. A pair of contact fingers 180 and 181 are arranged, one on each side of the insulating block 177, and these fingers are adapted to engage alternately with rails 178 and 179 when the brake pedal is depressed or released. The system is wired substantially as shown in Fig. 11 and includes a switch 182 which is preferably located within convenient reach of the driver as for example on the steering column of the leading car.

The normal position of the various parts is similar to that shown in Fig. 11 when the brake on the leading car and trailers are in the off position. If the operator desires to stop the train, he depresses the brake pedal 175 on the leading car which serves to apply the brakes on the leading car in the usual manner and also causes longitudinal movement of rod 176 and insulating block 177 so that contact fingers 180 and 181 are engaged with rails 179. Current then flows from the battery 183, wire 184, through the field winding of the motor 160, wire 185, contact finger 180, rail 179, wires 186, 187, armature of motor 160, wire 188, brush 171, plate 166, brush 170, wire 189, switch 182, wire 190, contact rail 179, contact finger 181, and through wire 191 to the battery. The motor 160 which is located, one on each trailer, rotates shaft 161ª and worm 162 to rotate gear 163 in a clockwise direction as viewed in Fig. 11. The motor continues to rotate until brushes 170 and 171 have passed off of plate 166 thereby breaking the circuit and stopping the motor. Meanwhile the rotation of gear 163 has rotated arm 173 to apply the brake on the trailer. When the operator releases the brake pedal 175 on the leading car, the insulating block 177 will be shifted to cause contact fingers 180 and 181 to engage with rails 178. Current now flows from battery 183, wire 184, through the field of motor 160, wire 185, contact finger 180, rail 178, wire 193, brush 168, plate 165 (which it is noted is slightly longer than plate 166) brush 167, wire 188, through the armature in an opposite direction than previously described, wire 187, rail 178, contact finger 181 and through wire 191 to the battery. This causes motor 160 and gear 163 to rotate in an opposite direction or counter clockwise as viewed in Fig. 11 and such rotation is continued until brushes 167 and 168 pass off of plate 165 which it is noted is of slightly less extent at this end than plate 166. The brake on each trailer is thereby released. If it is desired to apply the brakes lightly on each trailer, as when descending a long hill or similar conditions, the operator swings switch 182 about pivot 195 thereby opening its connection with wire 190 and simultaneously closing the circuit between contact points 196 and 197. A warning lamp 198 is thus shunted across the battery and lights warning the operator that the circuits are in a condition for only partial application of the brakes. Current flows from battery 183 through wire 184, field winding of motor 160, wire 185, brush 180, contact rail 179, wires 186, 187, through the armature of the motor, wire 188, brush 171, plate 166, brush 169, wire 199, switch 182, wire 190, rail 179, finger 181 and wire 191 to the battery. The motor 160 rotates gear 163 in a clockwise direction as before thereby to apply the brake on each trailer but such rotation will be stopped when contact finger 169 rides off of plate 166 due to the notch therein. The opening of switch 182 cuts out brush 170 hence current cannot flow to the battery through the former circuit. The notch in plate 166 may be arranged at any desired point so that the brakes may be applied to the desired degree only. The warning lamp 198 continues to burn as long as switch 182 is in such position that depression of brake pedal 175 will only cause a partial application of the trailer brakes. It will be understood of course that switch 182 may be closed at any time and hence permit a full application of the brakes on each trailer.

In Fig. 12 I have shown an electric control system for the operation of the change speed pedals of the trailers. In this figure 205 represents the change speed pedal of the leading car, and detachably connected to this pedal is a rod 206 which carries an insulating block 207 that is adapted to move in accordance with the movement of pedal 205. This block is provided with three contact fingers designated 208, 209 and 210. Contact finger 208 is adapted to engage with either of three contact plates 211, 212 or 213 depending upon whether change speed pedal is in low, neutral or high speed position, respectively. Slidably mounted on rod 206 and a second rod 214 arranged parallel therewith is a substantially U shaped insulating member 215. This member carries on one leg thereof a pair of contacts 216 and 217, which are adapted to engage with contacts 209 and 210, respectively, and on the opposite leg with contacts 218 and 219 which are adapted to engage with contacts 209 and 210, respectively. A spring urged finger 220 is fastened to member 215, and is frictionally engaged with rod 214 thereby to offer resistance to movement of the insulating member 215 on rods 206 and 214, however, such movement may be accomplished by either of abutments 221 or 222 engaging said member as will be explained hereinafter.

A reversible motor 160$^a$ is carried by each trailer and is provided with a worm 162$^a$ which meshes with a worm gear 163$^a$ that is rotatably mounted on the motor base as previously described. Gear 163$^a$ carries two conductor plates 165$^a$ and 166$^a$ insulating from each other and arranged in interlocked position. An arm 173$^a$ is fastened to gear 163$^a$ and the outer end of this arm is pivotally connected with a rod 223 which is telescoped within a tube 223$^a$ that is detachably connected to the change speed pedal of the trailer. A spring 223$^b$ interposed between the tube and rod provides a resilient connection between the change speed pedal and the operating arm 173$^a$.

The parts as shown in Fig. 12 are in high speed position for the leading car and trailers. If the operator depresses change speed pedal 205 on the leading car so as to place the same in neutral position, contact blades 209 and 210 will break with contacts 218 and 219 and close with contacts 216 and 217, the friction finger 220 engaging rod 214 normally preventing movement of insulating block 215 during such shift. Contact finger 208 will also move from contact 213 to 212. Under this condition current will flow from battery 183 through wire 225, the field of motor 160$^a$, wire 226, contact finger 208, contact 212, wire 227, brush 228, plate 166$^a$, brush 229, wire 230, contact 217, contact blade 210, wire 231, through the armature of the motor in a direction to rotate the gear 163$^a$ in a clockwise direction, wire 232, contact blade 209, contact 216 and through wire 233 to the battery. The motor 160$^a$ will rotate gear 163$^a$ in a clockwise direction until brush 228 rides off of plate 166$^a$ at the notch therein which of course breaks the circuit and stops motor 160$^a$. The point of break is so arranged that gear 163$^a$ will have rotated a distance sufficient to depress the change speed pedal on the trailer to a neutral position, hence each trailer is now in neutral position. If the driver wishes to place the vehicle train in low gear he depresses the pedal 205 of the leading car to its full forward position in the customary manner. When so depressed, collar 222 on rod 206 will engage insulating block 215 and force the block to the left as viewed in Fig. 12, against the resistance of friction finger 220. Contacts 209 and 216, and 210 and 217 remain closed and contact finger 208 moves into engagement with contact 211. Current now flows from battery 183 through wire 225, the field of motor 160$^a$, wire 226, contact finger 208, contact 211, wire 235, brush 236, plate 166$^a$, brush 229, wire 230, contact 217, contact blade 210 wire 231, through the armature of motor 160$^a$ in a direction to rotate gear 163$^a$ in a clockwise direction, wire 232, contact blade 209, contact 216, and wire 233 to the battery. The motor rotates gear 163$^a$ until brushes 236 and 229 ride off of plate 166$^a$. Meanwhile lever 173$^a$ has moved rod 221 thereby to depress the change speed pedal on the trailer and place the trailer in low speed.

If the operator now desires to go into high speed, he releases the pedal 205 on the leading car and the usual spring associated therewith pulls the pedal back into high speed position. Rod 206 moved to the right as shown in Fig. 12 and insulating block 207 with knife contacts 209 and 210 move to the right out of contact with 216 and 217 and into contact with 218 and 219 and further movement causes abutment 221 to engage block 215 to move said block against the restraint ordinarily imposed by friction finger 220. The parts assume the position shown in Fig. 12 and current now flows from battery 183, wire 225, through the field of motor 160$^a$, wire 226, contact finger 208, contact 213, wire 238, brush 239 and plate 165$^a$ (it being remembered that with the change speed pedal in neutral or low gear, the brushes 239 and 240 are engaged with the plate 165$^a$) brush 240, wire 241, contact 218, knife contact 209, wire 232, through the armature in a direction to rotate gear 163$^a$ in a counter clockwise direction, wire 231, knife contact 210, contact 219, and wire 242 to the battery. Gear 163$^a$ rotates in a counter clockwise direction until brushes 239 and 240 ride off of plate 165$^a$ as shown in Fig. 12. Meanwhile lever 173$^a$ has moved to permit the change speed pedal on the trailer to move rearwardly into high gear.

From the foregoing it will be obvious that movement of the change speed pedal on the leading car will automatically place the change speed pedals on each trailer in a corresponding position. The driver may operate the leading vehicle in the customary manner and the throttles, brakes and change speed pedals of each trailer will automatically be placed in corresponding positions.

Having thus described my invention, what I claim is:

1. The combination with a train of stock automobiles comprising a leading vehicle and one or more trailers, of independent pneumatically operated means detachably connected with the transmission and brake operating means of each trailer and comprising a pair of cylinders, a piston in each cylinder and connected one to the brake and the other to the transmission, electromagnetic means for operating the valves in each cylinder, and electric control means carried by the leading vehicle and connected with the brake and transmission thereof, said electric control means being connected with the electromagnetic means on each trailer thereby to automatically effect a movement of the transmission and brake on each trailer in accordance with the movement of the transmission and brake of the leading vehicle.

2. The combination with a train of stock automobiles comprising a leading vehicle and one or more trailers, of pneumatic means detachably connected with the transmission and brake operating means of each trailer, said pneumatic means comprising a pair of cylinders detachably connected to each trailer, a piston in each cylinder and connected one to the brake and the other to the transmission, electromagnetic means for operating the valves in each cylinder, an electrically operated mechanism mounted on each trailer and connected with the throttle thereon, and a plurality of electric control switches mounted in the leading vehicle and connected with the throttle, brake and transmission of the leading vehicle and with the respective controls of each trailer thereby to automatically effect the operation of each trailer in accordance with the operation of the leading vehicle.

3. A control unit adapted to be detachably secured to the controls of a stock automobile comprising a base adapted to be detachably connected to the vehicle, an electric motor mounted on said base, an element rotatable by said motor and adapted to be operatively connected to the vehicle throttle, and a remote control for operating said motor.

4. The combination with a train of standard or stock automobiles comprising a leading vehicle and a trailer, of pneumatically operated mechanism detachably connected with the change speed lever and foot brake of the trailer for operating the same, of power operated means detachably connected with the throttle of the trailer for operating the same, of means connecting the pneumatically operated mechanism of the trailer with the change speed lever and foot brake of the leading vehicle in such a manner that the change speed lever and foot brake of the two vehicles may be operated in unison and means connecting the power operated means for operating the throttle of the trailer with the throttle operating mechanism of the leading vehicle whereby the throttles of the trailer and leading vehicle may be operated in unison.

5. The combination with a train of stock vehicles comprising a leading vehicle and one or more trailers, of pneumatically operated, electrically controlled mechanism detachably connected with the change speed levers of each trailer for changing the speed of each trailer, of motor operated means detachably connected with the throttle of each trailer for changing the speed of the engine thereof, control means associated with the change speed lever of the leading vehicle and connected with the change speed lever of each trailer for regulating the speed of each trailer in synchronism with the speed of the leading vehicle and control means associated with the throttle of the leading vehicle and connected with the throttle operating means of each trailer for moving the throttle of each trailer in synchronism with the throttle of the leading vehicle.

6. The combination with a train of stock automobiles comprising a leading vehicle and one or more trailers, of a plurality of pneumatically operated mechanism detachably connected with the foot brake of each trailer respectively for operating the same, and means connecting said pneumatically operated mechanism with the foot brake operating means of the leading vehicle whereby the foot brakes of the leading vehicle and trailers are operated in unison.

7. The combination with a train of stock automobiles comprising a leading vehicle and one or more trailers, of pneumatically operated mechanism detachably connected with the change speed lever of each trailer and connections leading from said pneumatically operated mechanisms and operatively connected with the change speed lever of the leading vehicle in such a manner that the change speed levers of the leading vehicle and trailers are operated in unison.

8. The combination of a train of stock automobiles comprising a leading vehicle and one or more trailers, of a plurality of pneumatically operated mechanisms detachably connected to the change speed lever of each trailer, a plurality of power operated mechanisms detachably connected to the brake lever of each trailer, means connecting the said pneumatically operated mechanisms with the change speed lever of the leading vehicle and means connecting the said power operated mechanisms with the brake operating lever of the leading vehicle whereby the brake levers and the change speed levers of all of the vehicles may be operated in unison from the leading vehicle.

9. The combination with a train of stock automobiles comprising a leading vehicle and one or more trailers, of means detachably connected with the transmission of each trailer for operating the same, means detachably connected with the throttle of each trailer for operating the same and control means operatively associated with the transmission and throttle of the leading vehicle and connected with said first and second mentioned means for automatically operating the same in synchronism with the corresponding controls of the leading vehicle.

10. The combination with a train of stock automobiles comprising a leading vehicle and one or more trailers, of independent pneumatically operated mechanism detachably connected with the brake and transmission of each trailer for operating the same and electrical means operatively associated with and detachably connected with the brake and transmission of the leading vehicle and with the pneumatically operated mechanism on each trailer whereby to effect a movement of the trailer controls in accordance with the movement of the controls of the leading vehicle.

11. The combination of a train of stock automobiles comprising a leading vehicle and one or more trailers, of independent pneumatically operated means detachably connected with the transmission of each trailer for operating the same, additional pneumatic means detachably connected with the brake of each trailer for operating the same and electrical means detachably connected with the transmission and brake operating levers of the leading vehicle and each of the aforementioned pneumatic means whereby the brakes and transmissions of each of the trailers may be operated in unison with the corresponding controls of the leading vehicle.

12. The combination of a train of stock automobiles comprising a leading vehicle and one or more trailers, of independent pneumatically operated means detachably connected with the brakes of each trailer for operating the same, electrically operated means detachably connected with the throttle of each trailer for operating the same and electrical control means operatively associated with the brake and throttle of the leading vehicle and detachably connected with the brake operating and throttle operating means of each trailer whereby the brake and throttle of each trailer may be operated from the leading vehicle.

13. The combination with a train of stock automotive vehicles comprising a leading vehicle and one or more trailers, of independent power operated means detachably connected with the change speed levers of each trailer for operating the same, independent power operated means detachably connected with the throttle of each trailer for changing the speed of the motor of each trailer, control means operatively associated with the change speed lever and throttle of the leading vehicle and connected with each of said power operated means whereby the corresponding controls of all of the vehicles may be operated in unison.

14. The combination of a train of stock automotive vehicles each propelled by an internal combustion engine and having a transmission, a brake and a throttle, of independent pneumatically operated means detachably connected with the transmission and brake of each trailer for operating the same, of independent power operated means detachably connected with the throttle of each trailer for changing the speed of the motor of each trailer, electrical control means operatively associated with the transmission and brake operating means of the leading vehicle and with the brake operating and transmission operating means of each trailer, whereby the transmission and brake of each trailer may be operated in unison with the transmission and brake of the leading vehicle, and electrical means operatively connected with the throttle of the leading vehicle and the throttle operating means of each trailer whereby the throttle of each trailer may be operated in synchronism with the throttle of the leading vehicle.

15. The combination with a train of standard or stock automobiles comprising a leading vehicle and a trailer, of power operated mechanism detachably connected with the change speed lever and foot brake of the trailer for operating the same, of power operated means detachably connected with the throttle of the trailer for operating the same, of means connecting the power operated mechanism of the trailer with the change speed lever and foot brake of the leading vehicle in such a manner that the change speed lever and foot brake of the two vehicles may be operated in unison and means connecting the power operated means for operating the throttle of the trailer with the throttle operating mechanism of the leading vehicle whereby the throttles of the trailer and leading vehicle may be operated in unison.

16. The combination with a train of stock vehicles comprising a leading vehicle and one or more trailers, of power operated, electrically controlled mechanism detachably connected with the change speed levers of each trailer for changing the speed of each trailer, of motor operated means detachably connected with the throttle of each trailer for changing the speed of the engine thereof, control means associated with the change speed lever of the leading vehicle and connected with the change speed levers of each trailer for regulating the speed of each trailer in synchronism with the speed of the leading vehicle and control means associated with the throttle of the leading vehicle and connected with the throttle operating means of each trailer for moving the throttle of each trailer in synchronism with the throttle of the leading vehicle.

17. The combination of a train of stock automobiles comprising a leading vehicle and one or more trailers, of a plurality of power operated mechanisms detachably connected to the change speed lever of each trailer, a plurality of power operated mechanisms detachably connected to the brake lever of each trailer, means connecting the said power operated mechanisms with the change speed lever of the leading vehicle and means connecting the said power operated mechanisms with the brake operating lever of the leading vehicle whereby the brake levers and the change speed of all of the vehicles may be operated in unison from the leading vehicle.

18. The combination of a train of stock automobiles comprising a leading vehicle and one or more trailers, of independent power operated means detachably connected with the transmission of each trailer for operating the same, additional power operated means detachably connected with the brake of each trailer for operating the same and electrical means detachably connected with the transmission and brake operating levers of the leading vehicle and each of the aforementioned power operated means whereby the brakes and transmissions of each of the trailers may be operated in unison with the corresponding controls of the leading vehicle.

19. The combination of a train of stock automotive vehicles each propelled by an internal combustion engine and having a transmission, a brake and a throttle, of independent power operated means detachably connected with the transmission and brake of each trailer for operating the same, of independent power operated means detachably connected with the throttle of each trailer for changing the speed of the motor of each trailer, power operated control means operatively associated with the transmission and brake operating means of the leading vehicle and with the brake operating and transmission operating means of each trailer, whereby the transmission and brake of each trailer may be operated in unison with the transmission and brake of the leading vehicle, and power operated means operatively connected with the throttle of the leading vehicle and the throttle operating means of each trailer whereby the throttle of each trailer may be operated in synchronism with the throttle of the leading vehicle.

20. The combination with a train of stock automobiles comprising a leading vehicle and one or more trailers, of power operated mechanisms detachably connected with the transmission of each trailer respectively for operating the same and means for connecting said power operated mechanisms with the power operated mechanisms of the leading transmission operating means of the leading vehicle and trailers may be operated leading vehicle whereby the transmissions of the leading vehicle and trailers may be operated in unison.

21. The combination with a train of stock vehicles comprising a leading vehicle and one or more trailers, of power operated mechanism detachably connected with the change speed lever of each trailer for changing the speed of each trailer, of means detachably connected with the throttle of each trailer for changing the speed of the engine thereof, control means associated with the change speed lever of the leading vehicle and connected with the change speed lever of each trailer for regulating the speed of each trailer in synchronism with the speed of the leading vehicle, and control means associated with the throttle of the leading vehicle and connected with the throttle operating means of each trailer for moving the throttle of each trailer in synchronism with the throttle of the leading vehicle.

22. The combination with a train of stock automobiles comprising a leading vehicle and one or more trailers, of a plurality of power operated mechanisms detachably connected to the change speed lever of each trailer, a plurality of power operated mechanisms detachably connected to the brake lever of each trailer, means connecting said power operated mechanisms with the change speed lever of the leading vehicle and connecting the said power operated mechanisms with the brake operating lever of the leading vehicle whereby the brake levers and the change speed levers of all of the vehicles may be operated in unison from the leading vehicle.

23. The combination with a train of stock automobiles comprising a leading vehicle and one or more trailers, of independently power operated means detachably connected with the transmission of each trailer for operating the same, additional power operated means detachably connected with the brake of each trailer for operating the same and electrical means detachably connected with the transmission and brake operating levers of the leading vehicle and each of the said power operated means whereby the brakes and transmissions of each of the trailers may be operated in unison with the corresponding controls of the leading vehicle.

In testimony whereof, I hereunto affix my signature.

JAY H. GREENLEY.